(12) United States Patent
Anakli et al.

(10) Patent No.: US 11,933,451 B2
(45) Date of Patent: Mar. 19, 2024

(54) FOUR-AXES POSITIONING PLATFORM

(71) Applicant: ASELSAN ELEKTRONIK SANAYI VE TICARET ANONIM SIRKETI, Ankara (TR)

(72) Inventors: Mete Anakli, Ankara (TR); Caner Turker, Ankara (TR)

(73) Assignee: ASELSAN ELEKTRONIK SANAYI VE TICARET ANONIM SIRKETI, Ankara (TR)

( * ) Notice: Subject to any disclaimer, the term of this patent is extended or adjusted under 35 U.S.C. 154(b) by 0 days.

(21) Appl. No.: 18/013,912

(22) PCT Filed: Oct. 12, 2021

(86) PCT No.: PCT/TR2021/051039
§ 371 (c)(1),
(2) Date: Dec. 30, 2022

(87) PCT Pub. No.: WO2022/093156
PCT Pub. Date: May 5, 2022

(65) Prior Publication Data
US 2023/0313937 A1    Oct. 5, 2023

(51) Int. Cl.
F16M 11/18 (2006.01)
F16M 5/00 (2006.01)
F16M 11/12 (2006.01)
F16N 11/08 (2006.01)
G02B 7/00 (2021.01)

(52) U.S. Cl.
CPC .............. *F16M 11/18* (2013.01); *F16M 5/00* (2013.01); *F16M 11/121* (2013.01); *F16N 11/08* (2013.01); *G02B 7/004* (2013.01)

(58) Field of Classification Search
CPC ...... F16M 11/08; F16M 11/121; F16M 11/18; G02B 7/003; G02B 7/004; G02B 7/02; G02B 7/023
See application file for complete search history.

(56) References Cited

U.S. PATENT DOCUMENTS

| 3,424,413 | A | * | 1/1969 | Applegate | B23Q 1/545 |
|---|---|---|---|---|---|
|  |  |  |  |  | 248/661 |
| 4,360,974 | A | * | 11/1982 | de Cuissart | B23Q 1/545 |
|  |  |  |  |  | 33/645 |
| 4,655,548 | A |  | 4/1987 | Jue |  |
| 4,767,188 | A | * | 8/1988 | Myer | G02B 7/004 |
|  |  |  |  |  | 359/503 |
| 5,029,791 | A | * | 7/1991 | Ceccon | G02B 21/26 |
|  |  |  |  |  | 359/896 |
| 5,847,885 | A |  | 12/1998 | Arnone et al. |  |

(Continued)

FOREIGN PATENT DOCUMENTS

CN    105351695 A    2/2016

*Primary Examiner* — Eret C McNichols
(74) *Attorney, Agent, or Firm* — Bayramoglu Law Offices LLC

(57) ABSTRACT

A positioning platform providing positioning of component placed thereon onto four axes includes a lower plate, an upper plate, a first adjustment member, a second adjustment member, a third adjustment member, connection members, fixing members, a first fixing block, a second fixing block, fixing plates, slot fixing members, fixing covers, a yaw screw, a spring pin, a spring, and a yaw block.

1 Claim, 2 Drawing Sheets

(56) References Cited

U.S. PATENT DOCUMENTS

| | | | | |
|---|---|---|---|---|
| 6,072,569 A * | 6/2000 | Bowen | ............... | G01M 11/0214 |
| | | | | 356/243.1 |
| 7,463,435 B1 * | 12/2008 | Arnold | ................... | G02B 7/003 |
| | | | | 359/827 |
| 7,760,449 B2 * | 7/2010 | Theriault | ............... | G02B 7/004 |
| | | | | 359/811 |
| 8,059,347 B2 * | 11/2011 | Song | ...................... | G02B 7/004 |
| | | | | 359/829 |
| 8,215,199 B2 * | 7/2012 | Marcroft | ............. | B25J 17/0216 |
| | | | | 74/490.13 |
| 9,116,259 B2 * | 8/2015 | Zhu | ......................... | G02B 7/00 |
| 9,435,626 B2 * | 9/2016 | Buth | ...................... | G02B 7/004 |
| 9,739,414 B2 * | 8/2017 | Hung | ................... | F16M 11/043 |
| 2005/0001134 A1 * | 1/2005 | Lin | ........................ | F16M 11/18 |
| | | | | 248/424 |
| 2007/0195435 A1 | 8/2007 | Theriault et al. | | |
| 2011/0102919 A1 * | 5/2011 | Song | ..................... | G02B 7/004 |
| | | | | 359/822 |
| 2013/0037679 A1 | 2/2013 | Buth et al. | | |
| 2013/0120720 A1 * | 5/2013 | Hellin | .................... | G03B 21/14 |
| | | | | 353/121 |
| 2016/0169441 A1 | 6/2016 | Hung et al. | | |

\* cited by examiner

FOUR-AXES POSITIONING PLATFORM

CROSS REFERENCE TO THE RELATED APPLICATIONS

This application is the national phase entry of International Application No. PCT/TR2021/051039, filed on Oct. 12, 2021, which is based upon and claims priority to Turkish Patent Application No. 2020/17188, filed on Oct. 27, 2020, the entire contents of which are incorporated herein by reference.

TECHNICAL FIELD

Invention generally relates to a platform providing positioning setting of part placed thereon.

Invention particularly relates to a positioning platform used for accurate positioning in optic systems, providing accurate positioning of optic system placed thereon.

BACKGROUND

Today, one of the most important parts of vehicles used in defense industry are optic systems. Optic systems provide functions such as discovery of factors outside vehicle, targeting etc. For that reason, positioning of optic systems on vehicle accurately is needed. Platforms providing positioning on four axes are used to provide it.

In the related art, four axes are not on the same platform in platforms used for four-axis positioning. Different platforms are connected one on another to form four axis, and four axis positioning is thus provided. This causes cost increase and failure to obtain a compact structure in the current systems.

When the related art literature is searched, some documents are encountered. Document numbered US2007/0195435 discloses placement into optic controlled medium casing and adjustment of optic system assembly. In said structure, at least three smooth or slope plates are connected onto each other to achieve motion of axis. This case causes too thick of the embodiment. In addition, to many parts are used to provide movement of the plates. The application in the current position discloses an embodiment of high cost, difficult to use and not compact to provide movement on four axes.

The document numbered US2013/0037679 discloses affixing apparatus used for placing an optic component. In this embodiment, an adjustment plate made from transparent material is fixed to bottom kinematically. Support poles extend from adjustment plate for seating optic component. Optic component seated on support poles contain a number of aligning members from transparent base to align one or more than one edges. However, in this document, movement three axis other than yaw axis can be provided. Component to be inserted onto plate moving in angular way is used without connection onto three support parts and is tried to be aligned with support parts to prevent imbalance movement during tilt movement. In this case the mechanism can work only horizontally and otherwise it is possible to keep product on the mechanism. Also, a third plate is needed for connection of product to mechanism. The invention discloses a non-compact embodiment due to existing poles and balancing feet.

In conclusion, developments have been made in positioning platforms and, therefore, new embodiments eliminating the above disadvantages and offering solutions to existing systems are needed.

SUMMARY

The present invention relates to positioning platform meeting the needs mentioned above, eliminating all disadvantages, and providing some additional advantages.

Primary purpose of the invention is to provide a positioning of component placed thereon on four bases.

Another purpose of the invention is to provide conduct of function of positioning on four axes on a more non-compact single platform.

A further purpose of the invention is to disclose an embodiment of more convenient cost because positioning platform comprises single platform.

Another purpose of the invention is to provide conduct of movements of pitching, rolling, diversion and raising on one single platform.

The structural and characteristic features and all advantages of the invention will be understood better in the figures given below and the detailed description by reference to the figures. Therefore, the assessment should be made based on the figures and taking into account the detailed descriptions.

BRIEF DESCRIPTION OF THE DRAWINGS

In order to make the embodiment and additional members being subject of the present invention as well as the advantages clearer for better understanding, it should be assessed with reference to the fallowing described figures.

REFERENCE NUMBERS

Figure 1:
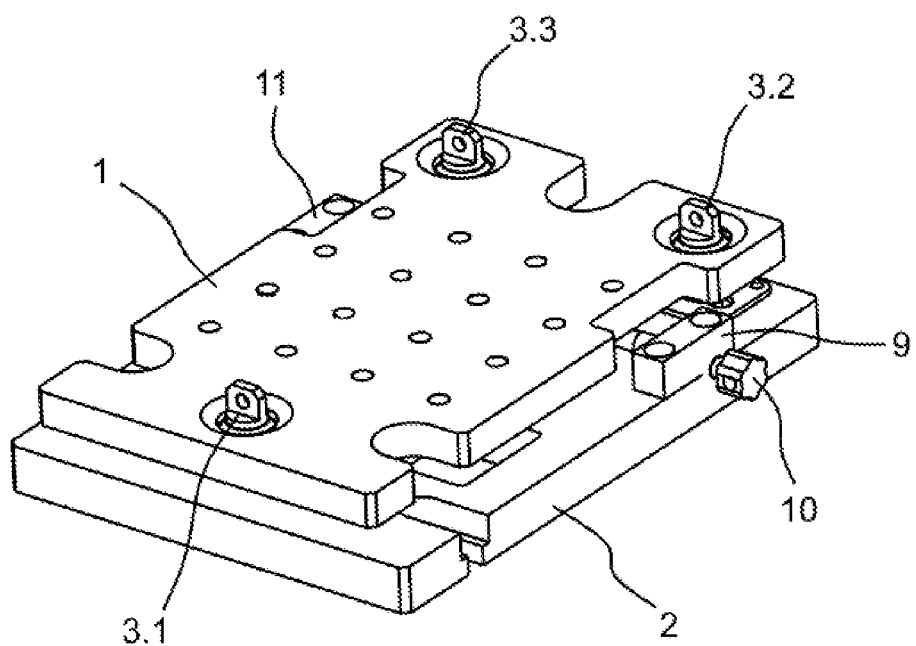
FIG. 1 is a perspective view of mounted positioning platform of the invention.

1. Upper plate
2. Lower plate
3.1. First adjustment member
3.2. Second adjustment member
3.3. Third adjustment member
4. Connection member
5. First fixing member
6. Slot fixing member
7. Fixing plate
8. Fixing cover
9. First fixing block
10. Yaw screw
11. Second fixing block
12. Spring pin
13. Spring
14. Yaw block

DETAILED DESCRIPTION OF THE EMBODIMENTS

In this detailed description, the preferred embodiments of the positioning platform being subject of the invention have been described in a manner not forming any restrictive effect and only for purpose of better understanding of the matter.

The invention is a positioning platform providing positioning of component placed thereon onto four axis and comprises a lower plate (2) providing fixing of the positioning platform, an upper plate (1) whereon a device placed onto positioning platform is connected and connected onto the lower plate (2), a first adjustment member (3.1), a second adjustment member (3.2) and a third adjustment member (3.3) providing connection and adjustment between upper plate (1) and the lower plate (2), connection members (4) providing connection of the first adjustment member (3.1), the second adjustment member (3.2) and the third adjustment member (3.3) to the upper plate (1), fixing members (5) providing fixing of the first adjustment member (3.1), the second adjustment member (3.2) and the third adjustment member (3.3) to the connection members (4), fixing plates (7) providing fixing of the connection members (4) to the upper plate (1), slot fixing members (6) providing fixing of the second adjustment member (3.2) and the third adjustment member (3.3) in slots on the lower plate (2), fixing covers (8) providing fixing of the slot fixing members (6) in the lower plate (2), a yaw screw (10) located between the upper plate (1) and the lower plate (2) and connected to a first fixing block (9) connected to the lower plate (2) and connected to the first fixing block (9), a spring pin (12) and a spring (13) located between the upper plate (1) and the lower plate (2) and connected to a second fixing block (11) connected to the lower plate (2) and connected to the second fixing block (11), a yaw block (14) located between the first fixing block (9) and the second fixing block (11) between the upper plate (1) and the lower plate (2) and connected to the upper plate (1).

Figure 2:
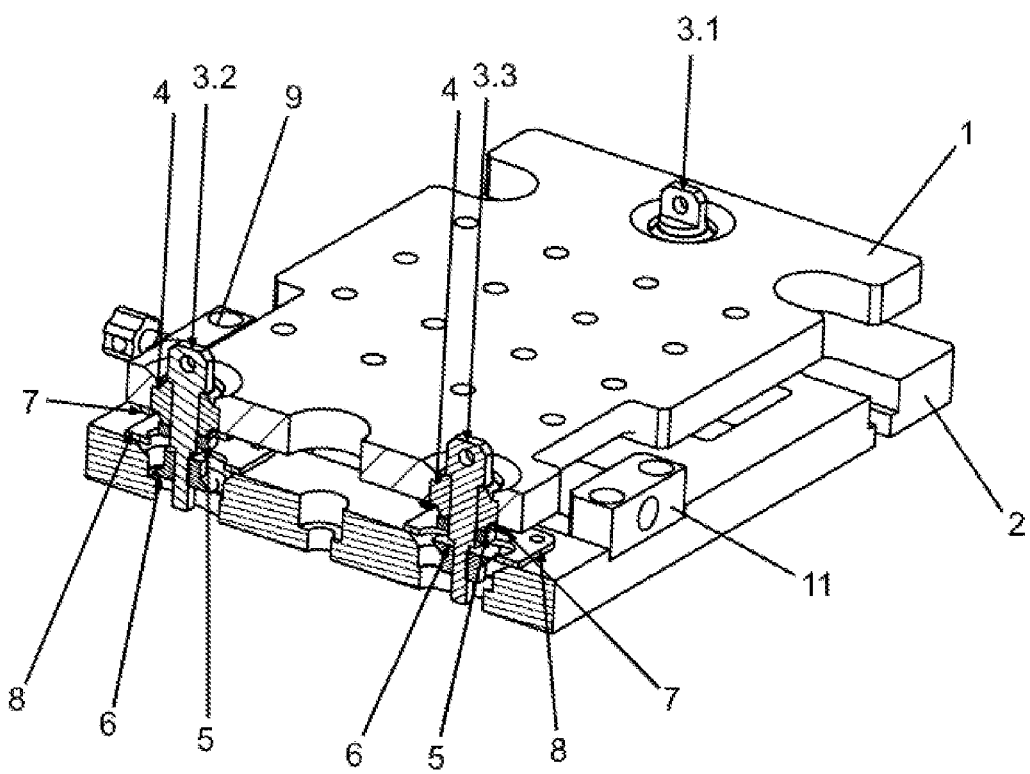
FIG. 2 is a cross-sectional perspective view of mounted positioning platform of the invention.
Figure 3:
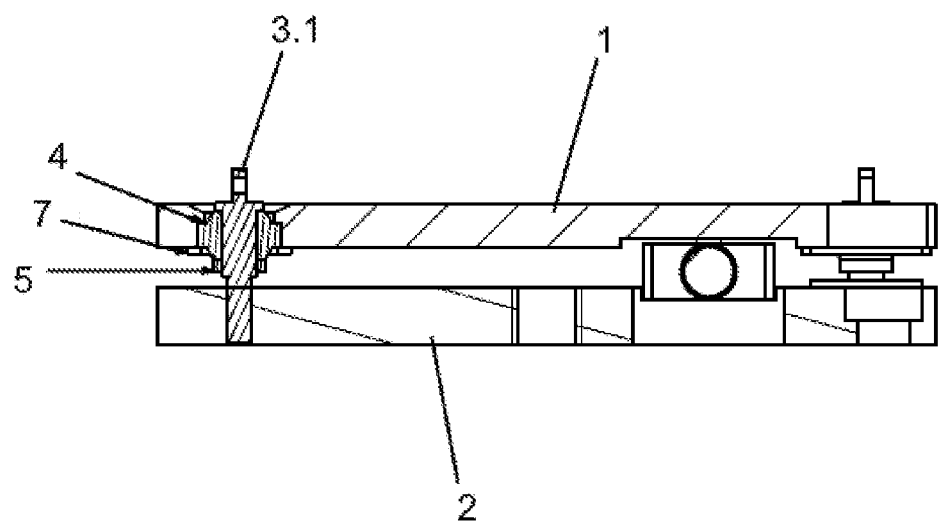
FIG. 3 is a side view of positioning platform.

FIG. 1 and FIG. 2 show perspective views of positioning platform. Positioning platform comprises an upper plate (1) and a lower plate (2) placed onto one another. Interconnection of upper plate (1) and lower plate (2) and positioning of upper plate (1) onto lower plate (2) are provided by first adjustment member (3.1), second adjustment member (3.2) and third adjustment member (3.3). Connection of adjustment members (3.1, 3.2, 3.3) to upper plate (1) is provided by connection members (4) placed into upper plate (1). Said connection members (4) are preferably joint bearing. Fixing of adjustment members (3.1, 3.2, 3.3) in connection members (4) is provided by first fixing members (5) which are preferably nut. Part of adjustment members (3.1, 3.2, 3.3) entering connection members (4) has threads drilled thereon. First fixing members (5) of adjustment members (3.1, 3.2, 3.3) are screwed onto the gear part and fixing of adjustment members (3.1, 3.2, 3.3) to connection members (4) is provided. Fixing plates (7) are used to prevent removal of connection members (4) from upper plate (1).

End parts of adjustment members (3.1, 3.2, 3.3) is in thread drilled form for height and tilt motions. Threat is drilled on lower plate (2) for connection of first adjustment member (3.1). Second adjustment member (3.2) and third adjustment member (3.3) are screwed and fixed to slot fixing members (6) placed on angular slots placed on lower plate (2). Fixing covers (8) are used for fixing of said slot fixing members (6) into lower plate (2). Slot fixing members (6) is produced in "V" form similar to slots where they are placed into. Thus, contact to more surface is provided and tilt movement of slot fixing members (6) inside slots is made and locking is prevented.

Figure 4:
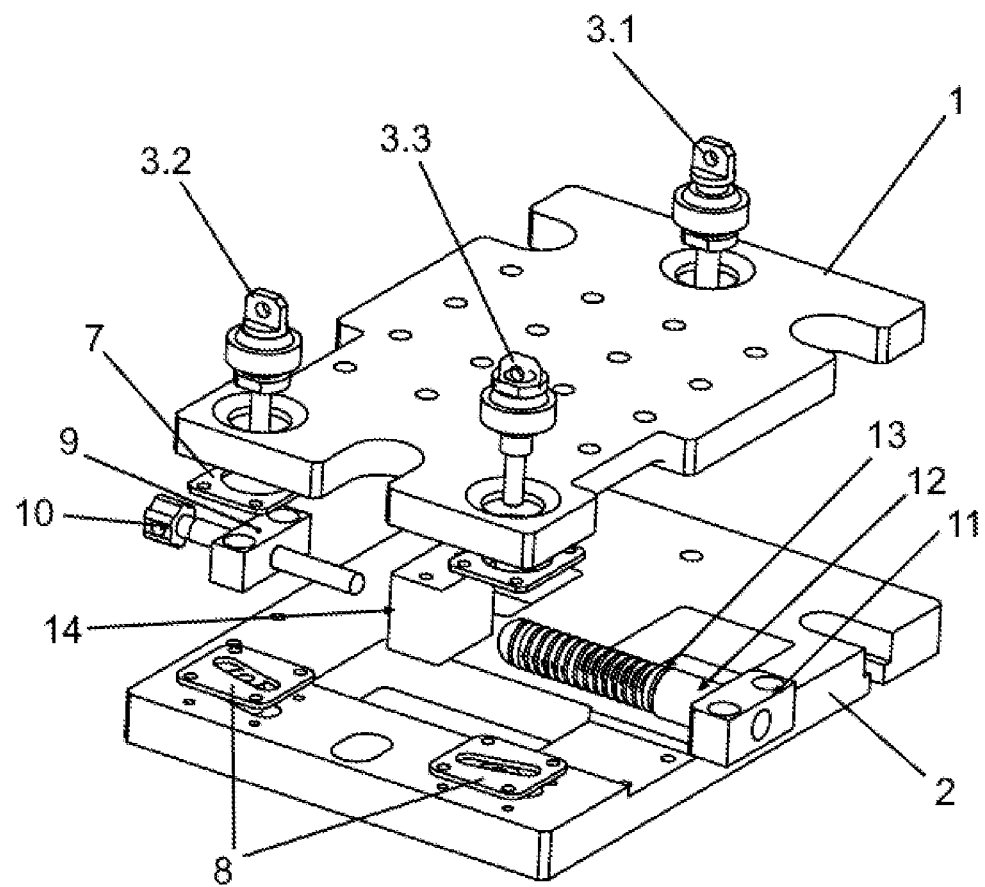
FIG. 4 is a perspective view of mounted positioning platform of the invention in demounted position.

FIG. 4 shows a view of the positioning platform in demounted position. On lower plate (2) there are a first fixing block (9) and a second fixing block (11) located on both sides of lower plate (2) to remain between second adjustment member (3.2) and third adjustment member (3.3) and first adjustment member (3.1) and fixed thereon. A yaw block (14) remaining in between said first fixing block (9) and second fixing block (11) and connected to upper plate (1). A yaw screw (10) is fixed onto first fixing block (9). Turning yaw screw (10) provides progress towards yaw block (14) or leaving away from yaw block (14). A spring pin (12) and a spring (13) is fixed to second fixing .block (11). yaw screw (10) and spring (13) remain as resting on yaw block (14) in normal position. In normal position, spring (13) is in a position applying pressured to yaw block (14) but yaw block (14) remains in fixed position between two loads due to yaw screw's (10) resting on yaw block (14).

In positioning platform, rolling, pitching, and raising movements are provided by adjustment of adjustment members (3.1, 3.2, 3.3). Rolling movement is provided by turning up and down in different directions the second adjustment member (3.2) or third adjustment member (3.3) while first adjustment member (3.1) is in fixed position. Pitching movement is provided by turning up or down in the same direction the second adjustment member (3.2) and third adjustment member (3.3) while first adjustment member (3.1) is in fixed position. Raising movement is provided by turning in the same direction the first adjustment member (3.1), the second adjustment member (3.2) and third adjustment member (3.3).

In positioning platform, diversion movement is provided by means of adjustment (turning) second adjustment member (3.2), third adjustment member (3.3) and yaw screw (10) in a manner first adjustment member (3.1) remains as turning centre. In diversion movement, when yaw screw (10) is turned in clockwise direction, it pushes yaw block (14) and compresses spring (13). Upper plate (1) is turned anti-clockwise as a result of such movement. When yaw screw (10) is moved in anti-clockwise direction, spring (13) in compressed position pushes the yaw block (14) and provides movement of upper plate (1) in clockwise direction.

What is claimed is:

1. A positioning platform providing positioning of component placed thereon onto four axes, comprising a lower plate providing fixing of the positioning platform, an upper plate whereon a device placed onto the positioning platform is connected and connected onto the lower plate, a first adjustment member, a second adjustment member and a third adjustment member providing connection and adjustment between the upper plate and the lower plate, connection members providing connection of the first adjustment member, the second adjustment member and the third adjustment member to the upper plate, fixing members providing fixing of the first adjustment member, the second adjustment member and the third adjustment member to the connection members, a first fixing block and a second fixing block located and fixed on both sides of the lower plate to remain between the second adjustment member and the third adjustment member and the first adjustment member, fixing plates providing fixing of the connection members to the upper plate, slot fixing members providing fixing of the second adjustment member and the third adjustment member in slots on the lower plate, fixing covers providing fixing of the slot fixing members in the lower plate, a yaw screw located between the upper plate and the lower plate and connected to a first fixing block connected to the lower plate and connected to the first fixing block, a spring pin and a spring located between the upper plate and the lower plate and connected to a second fixing block connected to the lower plate and connected to the second fixing block, and a yaw block located between the first fixing block and the second fixing block between the upper plate and the lower plate and connected to the upper plate.

\* \* \* \* \*